INVENTOR
Walter J. Brown
BY Connolly and Hutz
ATTORNEYS

Aug. 9, 1966 W. J. BROWN 3,265,955
APPARATUS FOR INITIATING CONDUCTION
Filed July 13, 1962 7 Sheets-Sheet 2

INVENTOR
Walter J. Brown

BY Connolly and Hutz
ATTORNEYS

Aug. 9, 1966  W. J. BROWN  3,265,955
APPARATUS FOR INITIATING CONDUCTION
Filed July 13, 1962  7 Sheets-Sheet 3
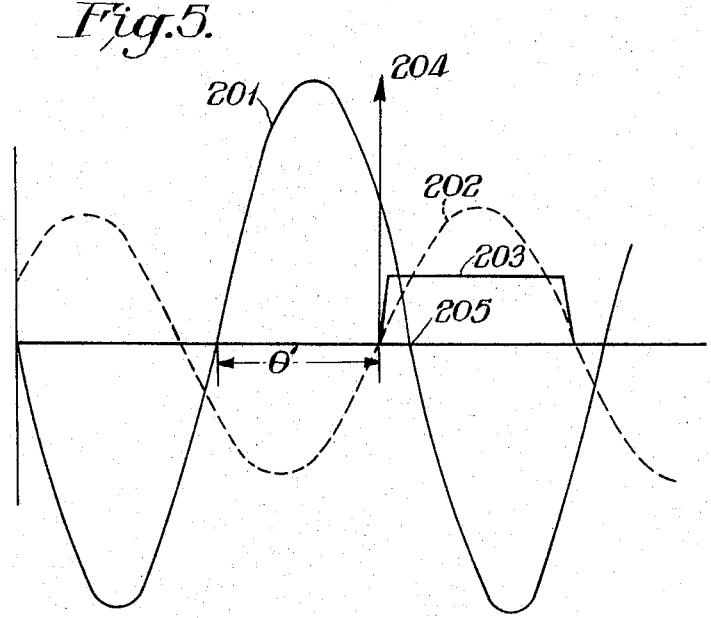
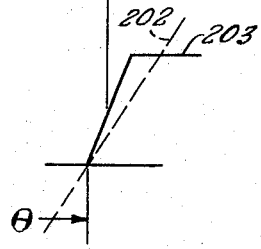
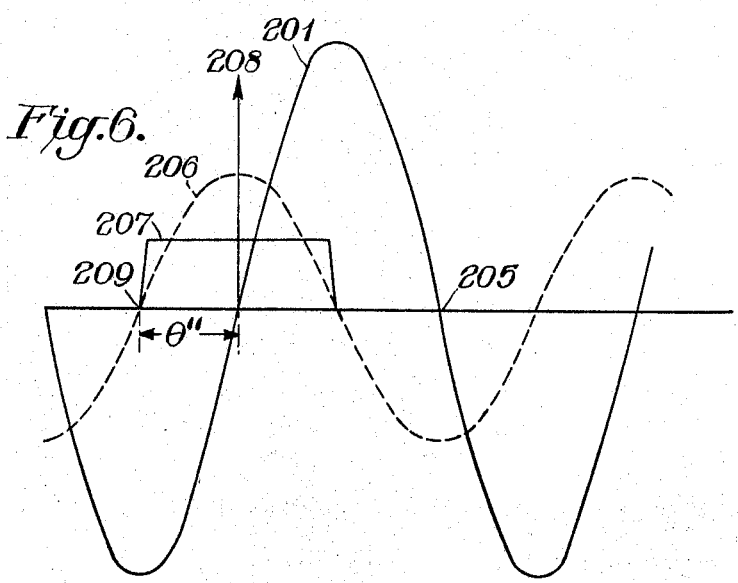
INVENTOR
*Walter J. Brown*
BY *Connolly and Hutz*
ATTORNEYS

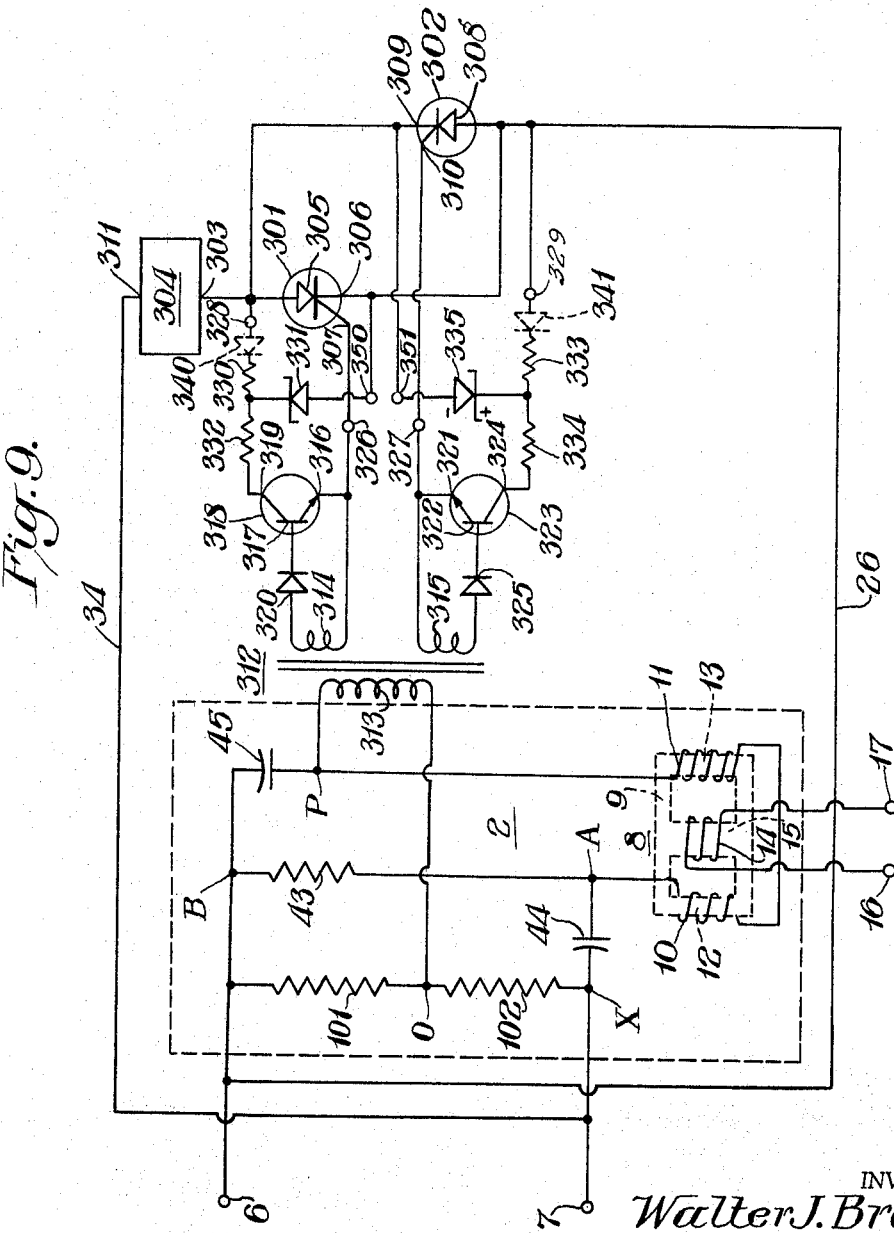

Aug. 9, 1966 — W. J. BROWN — 3,265,955
APPARATUS FOR INITIATING CONDUCTION
Filed July 13, 1962 — 7 Sheets-Sheet 5
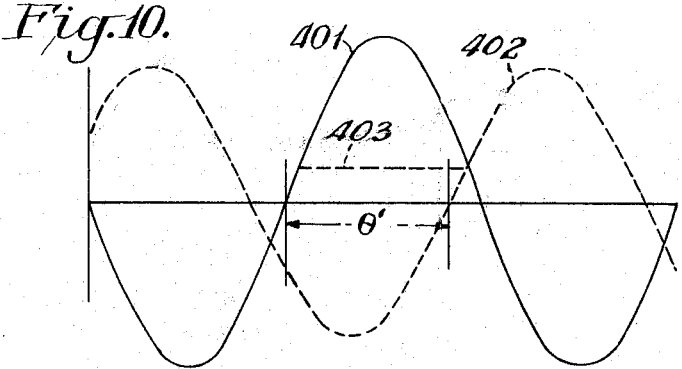
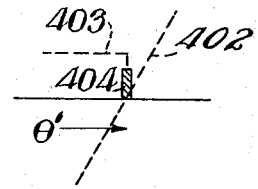
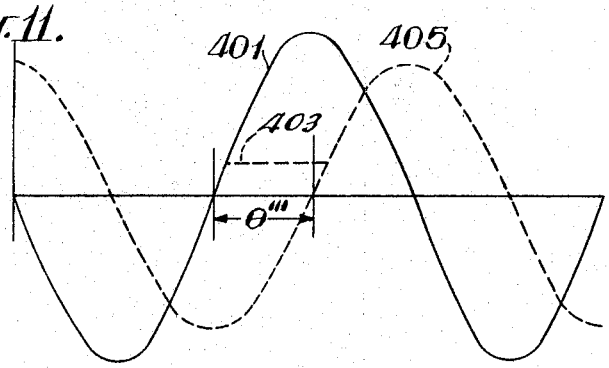
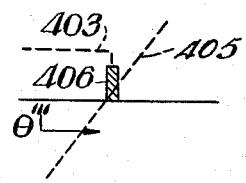
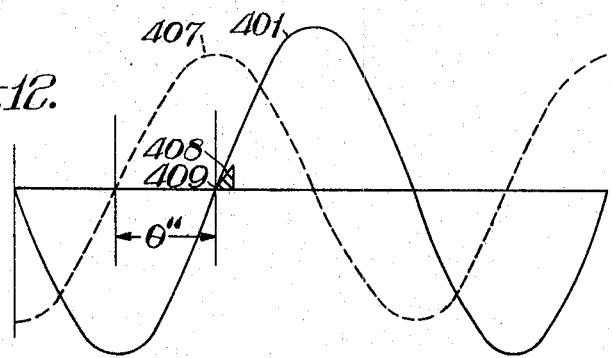
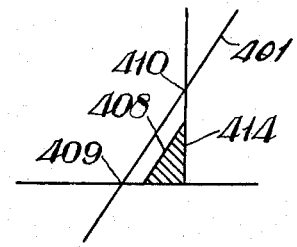
INVENTOR
Walter J. Brown
BY Connolly and Hutz
ATTORNEYS Aug. 9, 1966   W. J. BROWN   3,265,955
APPARATUS FOR INITIATING CONDUCTION
Filed July 13, 1962   7 Sheets-Sheet 7

INVENTOR
Walter J. Brown
BY Connolly and Hutz
ATTORNEYS

United States Patent Office 3,265,955
Patented August 9, 1966

3,265,955
APPARATUS FOR INITIATING CONDUCTION
Walter J. Brown, Stamford, Conn., assignor to Sprague Electric Company, North Adams, Mass., a corporation of Massachusetts
Filed July 13, 1962, Ser. No. 209,617
12 Claims. (Cl. 323—22)

This invention relates to the control of silicon controlled rectifiers and more particularly to a phase-shifting control means for silicon controlled rectifiers.

A silicon controlled rectifier is a three-terminal device having an anode, a cathode and a gate. It is capable of conducting current only when the anode is under a positive voltage with respect to the cathode. Further, a certain minimum positive voltage and current applied to the rectifier gate is necessary to the initiation of the anode conduction. This application of minimum positive voltage and current to the gate is commonly referred to as firing. After firing the anode will conduct current to the cathode with a low voltage drop of the order of one volt. That is after the rectifier has been fired by the application of voltage and current to its gate, the rectifier anode will continue to conduct as long as the anode voltage remains positive with respect to the cathode even if the gate firing current is removed.

Silicon controlled rectifiers have various uses including the control of the amount of power delivered from an alternating current supply to a load. The control is achieved through the application of the required positive firing voltage and current to the gate. This firing control is applied at a desired instant during each of the half-cycles during which the anode is positive. This is the half-cycle which alternates with the half-cycle during which the anode is negative. After the positive firing voltage is applied to the gate, the silicon controlled rectifier delivers power for the remainder of the positive half-cycle. It is possible to vary the instant of firing the rectifier over the range of the 180° of the positive half-cycle of the anode voltage and by thus varying the firing angle the output from the silicon controlled rectifier to the load may be varied from zero to a maximum.

It is a feature of this type of device and its operation that the requirements of the gate firing voltage and current are both variable and critical. For instance, one type of silicon controlled rectifier may require anything between 0.3 and 3.5 volts at any current up to 120 milliamps even under conditions of low line voltage; on the other hand, the gate voltage must never exceed 10 volts at 100 milliamps even under conditions of high line voltage. Furthermore these limits must not be exceeded at any required firing angle, over a full 180-degree range.

To ensure a consistent firing angle, it is necessary to supply the gate with a pulse having a steeply rising front, the phase angle of which can be varied from at least 0 degrees to 180 degrees in relation to the A.C. anode supply voltage. The required variation in phase angle is conveniently obtained from a phase-shifting network. It is also desirable that the phase angle should have a reasonably linear relationship to a desired electrical control quantity, such as a D.C. control voltage or current. To obtain such a linear relationship over a full 180 degrees it is necessary to provide a phase-shifting network which has a substantially wider total range of phase shift. Reference is made to the networks described in applicant's U.S. Letters Patents Nos. 2,524,759, 2,524,760, 2,524,761 or 2,524,762. These patents describe phase-shifting networks which are useful with this invention.

It is an object of this invention to provide a control for a silicon controlled rectifier in which an output from a phase-shifting network is used to vary the time of application of the firing signal to a silicon controlled rectifier.

It is another object of this invention to provide an apparatus in which a phase-shifting network is connected to a transistor and the transistor is connected to the gate electrode of a silicon controlled rectifier so as to vary the time of application of the firing signal.

These and other objects of this invention will become more apparent upon consideration of the following description taken together with the drawings in which FIGURE 1 is a schematic diagram of a control circuit for a silicon controlled rectifier according to this invention;

FIGURE 5 and FIGURE 6 illustrates the wave forms and the voltage time relationships between alternating voltages applied in the control circuits illustrated in FIGURES 1 and 2;

FIGURE 7 is a detail of the voltage pulse at the firing instant;

FIGURE 9 is a schematic diagram of a modified control circuit according to this invention for firing silicon controlled rectifiers;

FIGURES 10, 11 and 12 illustrate the wave forms and the voltage time relationships between alternating voltages in the control circuit of FIGURE 9;

FIGURE 13 is a detail of the gate pulse and the voltage available for delivering the gate pulse in FIGURE 10;

FIGURE 14 is a detail of the gate pulse and the voltage available for delivering the gate pulse of FIGURE 11;

FIGURE 15 is a detail of the pulse of FIGURE 12;

In general, this invention provides a phase-shifting network having its output coupled to the base and to one other terminal of a transistor, and an emitter or collector current of the transistor delivered to the gate of a silicon controlled rectifier so that the output of the phase-shifting network may vary the time of application of the firing signal to the silicon controlled rectifier. For the purpose of simplicity the silicon controlled rectifier of this description is hereinafter referred to as the SCR.

The phase-shifting network preferably provides a maximum phase shift in excess of 180 degrees for the purpose of obtaining substantially linear relationship between phase angle and a controlling current or voltage over a full 180 degrees. The collector circuit of the transistor is preferably supplied from the A.C. anode supply source or from the SCR anode itself so as to suppress the gate pulse when the SCR anode is negative. The collector supply circuit includes rectifier means for inhibiting the application of reverse voltage to the collector of the transistor; preferably the rectifier means includes a zener diode which also limits the forward voltage applied to the collector.

Figure 1:
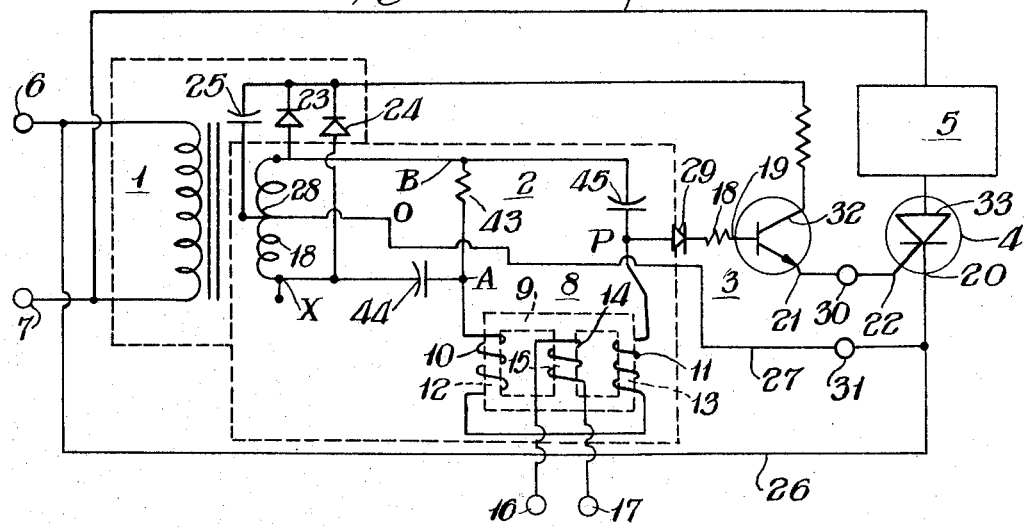

FIGURE 1 illustrates one form of the invention, comprising transformer and power supply unit 1, phase-shifting network 2, transistor 3, silicon controlled rectifier 4 and load 5, supplied from A.C. input terminals 6 and 7.

Figure 2:
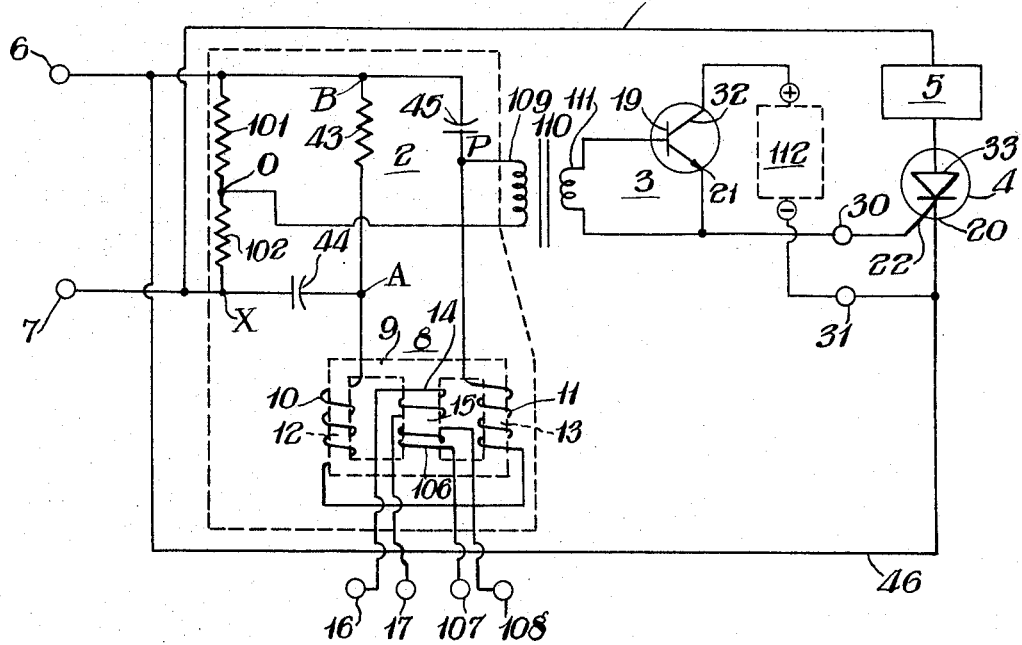
FIGURE 2 is a schematic diagram of another embodiment of the control circuit of this invention.

The phase-shifting network, which is supplied with A.C. from the center-tapped secondary winding 18 of transformer 1, is similar to that described in U.S. Patent 2,524,762 issued to applicant, with reference to FIGURE 5 therein, and FIGURE 2 therein is a vector diagram showing the phase relationships of its various voltages. Resistor 43 and capacitor 44 in FIGURE 1 hereof correspond to resistor 29 and capacitor 28 in FIGURE 5 of U.S. Patent 2,524,762. The variable inductive element 31 in said FIGURE 5 takes the form of a saturable core reactor 8 in FIGURE 1 of this specification. This comprises a saturable magnetic core 9 having three legs, serially connected A.C. coils 10 and 11 are wound on the outer legs 12 and 13 and a D.C. control winding 14 is wound on the center leg 15. A D.C. control signal applied to terminals 16 and 17 will partially saturate the magnetic core 9 and reduce the inductance of the A.C. coils 10 and 11, thus advancing the phase angle of the A.C. output voltage between terminals O and P of the phase-shifting network 2 in the manner described in U.S. Patent 2,524,762.

The output terminal P of the phase-shifting network 2 is connected through diode 29 and resistor 18 to the transistor base 19; the output terminal O of the phase-shifting network is connected through terminal 31 to the cathode 20 of the silicon controlled rectifier 4. The emitter 21 of transistor 3 is connected through terminal 30 to the gate 22 of the silicon controlled rectifier (hereinafter abbreviated SCR).

The transistor 3 is of the NPN type, and its collector 32 is supplied with positive D.C. from transformer secondary winding 18 and diodes 23, 24, which D.C. is filtered by capacitor 25, and the collector current is returned through the emitter 21, the terminal 30, the SCR gate 22, the SCR cathode 20, the terminal 31 and conductor 27 to the center tap 28 of transformer secondary 18 which forms the negative D.C. supply terminal. Accordingly, the transistor 3 will deliver positive current from its emitter to the SCR gate 22 whenever a suitable positive current is supplied to the transistor base 19; this occurs during substantially each entire positive half cycle of the phase shifter output voltage OP.

The SCR cathode 20 is connected through conductor 26 to A.C. input terminal 6. The SCR anode 33 is connected to its load 5 and thence through the load 5 and conductor 34 to the A.C. input terminal 7.

FIGURE 2 shows another embodiment of the invention, in which several of the elements are similar to those of FIGURE 1, and such elements will be similarly numbered.

The phase-shifting network 2 has the same general configuration as that described in U.S. Patent 2,524,762 with particular reference to FIGURE 1 and the vector diagram FIGURE 2 therein. The center tap 0 is provided by serially connecting two equal resistors 101 and 102 across the A.C. input terminals 6 and 7. Resistor 43 and capacitor 44 in FIGURE 2 hereof correspond to resistor 29 and capacitor 28 of U.S. Patent 2,524,762. Variable inductive element in the form of saturable reactor 8 and fixed capacitor 45 correspond with inductive element 31 and capacitor 32 in U.S. Patent 2,524,762.

In FIGURE 2 hereof, the saturable core reactor 8 is provided with an additional D.C. control winding 106 connected to terminals 107, 108 so as to permit mixing and summation of a plurality of control signals.

The output terminals O and P of the phase-shifting network 2 are connected to the primary 109 of a small step-down transformer 110 having a secondary winding 111 which is connected between the base 19 and emitter 21 of the transistor 3. This provides impedance matching between the high impedance output of the resonant phase-shifting network and the low resistance input of the base-to-emitter circuit of the transistor; it also provides isolation of the transistor from the A.C. input terminals 6 and 7.

The collector 32 of transistor 3 is supplied from the terminal marked with a plus sign on a suitable D.C. power supply source 112. When the base 19 is driven positive by the A.C. output of transformer secondary 111, the emitter 21 delivers current through the terminal 30 to the gate 22 of the SCR, and thence through the SCR cathode 20 and terminal 31 to the terminal on the D.C. power source 112 marked with a minus sign. This causes the SCR 4 to conduct during the remainder of the half-cycle when the terminal 7 connected to the anode by load 5 and conductor 34 is positive.

A circuit constructed in accordance with FIGURE 2 and with the circuit parameters listed below exhibited a pulse, having a start at a phase angle with the A.C. input voltage which could be varied from an almost 180° lag through to an angle substantially leading the input voltage by passing a few milliamperes of D.C. through the control winding 14. The following typical circuit parameters were used:

Resistors 101 and 102 ____ 10,000 ohms each.
Resistor 43 _____ 17,000 ohms.
Capacitor 44 _____ 0.1 mfd.
Capacitor 45 _____ .047 mfd.
Transformer 110 _____ "0–3 ouncer" transformer made by United Transformer Co., Inc.
Transistor 3 _____ Sylvania 2N102, NPN type.
SCR gate load _____ 32 ohms.

In this control an A.C. input of 72 volts R.M.S. 60 cycles and a 5.4 volt D.C. source provided an almost rectangular pulse extending for a duration of nearly 180°, and with an almost constant amplitude of 4.1 volts.

It will be noted that in FIGURE 1 the phase-shifter output terminals P and O are connected between the transistor base 19 and the cathode 20 of the SCR 4, so that the transistor circuit has the configuration of an emitter-follower, thus increasing the effective resistance which is connected across the phase-shifter output terminals O and P.

On the other hand, in FIGURE 2, the output OP of the phase-shifting network is first stepped down to a lower resistance level by means of transformer 110 and is then applied to the transistor base and emitter directly, so that in this case the transistor input resistance is not increased by any emitter-follower effect.

The waveforms occurring in the arrangements of FIGURES 1 and 2 will now be described and illustrated in FIGURES 3 to 7.

Figure 3:
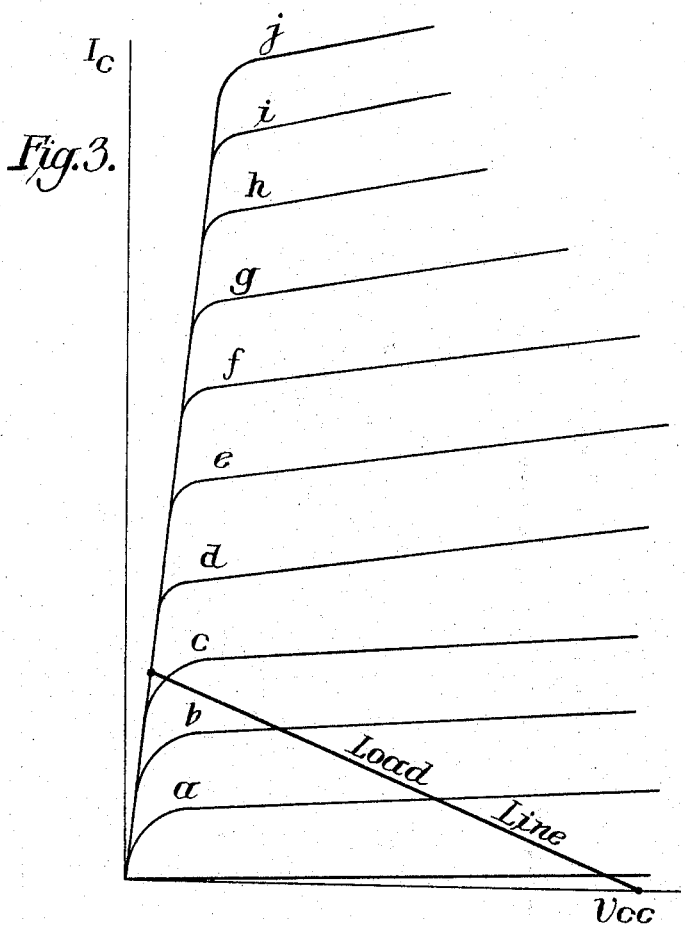
FIGURE 3 is a graph of characteristics of a transistor in the control circuit of this invention.
Figure 4:
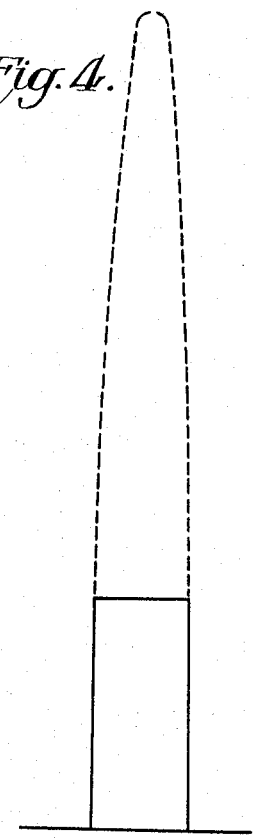
FIGURE 4 illustrates the input current and the output current wave forms of the transistor characterized in FIGURE 3.

A feature of the invention is that the transistor characteristics and applied voltages are such that the output of the phase-shifting network drives the transistor into saturation during most of each positive half-cycle, so that a prolonged gate pulse having a steep leading edge followed by a substantially flat top with a duration approaching 180 degrees is delivered to the SCR gate 22 during each alternate half-cycle, as shown in FIGURES 3 and 4. FIGURE 3 shows a typical family of collector characteristics for a transistor connected in a common emitter configuration, in which collector current $I_c$ is plotted against collector voltage $V_c$ for progressively increasing base currents represented by curves $a$ through $j$. A load line has been drawn from a point $V_{cc}$ representing the D.C collector supply voltage, at a slope corresponding to the effective resistance loading imposed on the transistor by the SCR gate and any other resistances in the collector-emitter circuit. FIGURE 4 shows in dotted lines the base current delivered to the transistor by the phase-shifting network during the positive half-cycle of its output, showing that this has a peak value corresponding to curve $j$; however, the load line runs into saturation, so that no more collector voltage, and therefore no more collector current, is available after a level corresponding to curve c.

Accordingly, the collector current waveform, and also the emitter current waveform, has a substantially flat top at a level corresponding with curve c, as shown by full lines in FIGURE 4. This substantially rectangular or trapezoidal waveform is particularly suitable for the firing of silicon controlled rectifiers as will later become apparent.

FIGURE 5 shows certain waveforms and phase relationships occurring in the arrangements of FIGURES 1 and 2 when little or no current is passed into the control windings 14 or 106 of the saturable core reactor 8. Curve 201 represents the A.C. input to the phase-shifting network 2 and the anode voltage which is applied through load 5 to the SCR anode 33. Curve 202 represents the output voltage OP of the phase-shifting network 2 under ideal open circuit conditions. This output voltage lags the input voltage by an angle $\theta'$ which is nearly 180°, for reasons which will be explained with reference to the vector diagram in FIGURE 8.

Curve 203 shows the voltage pulse which is delivered by the saturated transistor 3, through terminals 30 and 31, across the gate 22 and cathode 20 of the SCR 4. Since the output voltages 202 of the phase shifter, and 203 of the transistor, are delayed by almost 180° with reference to the SCR anode supply voltage 201, the SCR will not fire until the instant in time indicated by the arrow 204, and will then usually only conduct until the time instant 205, at which the anode supply voltage goes negative; accordingly the SCR 4 will only deliver a very small output to the load 5. FIGURE 7 shows in detail the instant indicated at 204 and the voltage pulse 203.

FIGURE 6 shows the waveforms and phase relationships existing when a substantial D.C. control current is passed through the saturable reactor control winding 14. The output voltage 206 from terminals OP of the phase-shifting network will now lead the A.C. input voltage by an angle $\theta''$ of approximately 90°, as will be described with reference to the vector diagram in FIGURE 8. The output pulse from the transistor 3 to the SCR 4 will now be as shown in curve 207, and the SCR will fire at the instant 208 when its anode first becomes positive. It should be noted that the gate pulse 207 starts at the instant 209 when the SCR cannot fire since its anode supply voltage 201 is negative, but the pulse 207 persists so that the SCR will fire almost immediately after its anode has become positive, at instant 208.

The continuation of the gate pulse 207 until the anode becomes positive at 208 is an important feature of the invention, since a short pulse which terminated before the instant 208 would not fire the SCR at all.

Furthermore, the gate pulse 203, 207 is of substantially constant amplitude, owing to the fact that the transistor 3 is saturated, and due to the fact that the output from terminals OP of the phase-shifting network is substantially constant in amplitude, it has a consistently fast rise time, as will now be explained with reference to the vector diagrams in FIGURE 8.

Figure 8:
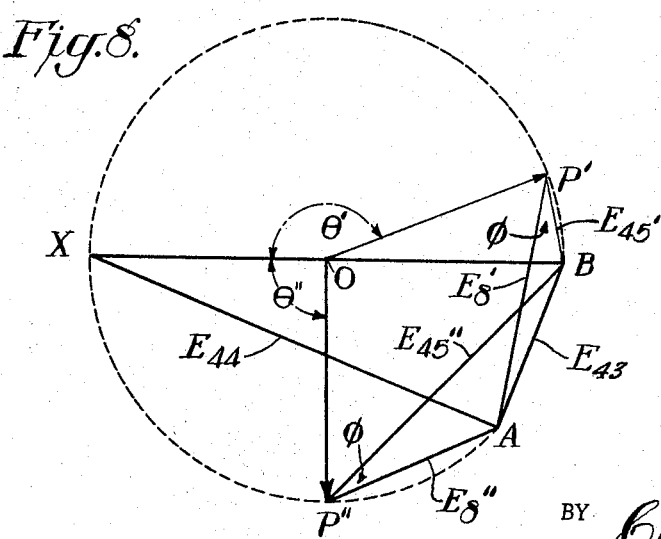
FIGURE 8 is a voltage vector diagram depicting voltage vectors obtained in a preferred form of phase-shifting network.

FIGURE 8 is a voltage vector diagram of the phase-shifting networks 2 in FIGURES 1 and 2. BX represents the input voltage to the network, with a center tap at O. XA represents the voltage across capacitor 44, and AB is the voltage across resistor 43.

AP′ represents the voltage across the A.C. windings of the saturable reactor 8 when no D.C. control current is applied; P′B is the voltage across capacitor 45 under the same conditions. In the absence of D.C. control current, the impedance of the saturable reactor 8 is high compared with that of capacitor 45 and accordingly the vector AP′ is long compared with the vector P′B and P′ is located near to B on the vector diagram as shown; in this diagram the angle AP′B which is marked $\phi$ is equal to the loss angle of the saturable reactor.

Upon applying D.C. control current to the saturable reactor, the impedance of its A.C. windings decreases, thus reducing the length of vector AP′ in relation to vector P′B. Assuming that the loss angle $\phi$ remains constant, the point P′ will therefore move counter-clockwise around the dotted arcuate locus until it reaches position P″ with a large D.C. control current. By suitable choice of value of the resistor 43 the arcuate locus may be made to pass through the point X and it will then be seen that the output voltage OP of FIGURES 1 and 2 remains substantially constant in amplitude, since it is a radius of the circle. At the same time its phase angle varies from nearly 180° lagging the input voltage BX as shown by OP′ at an angle $\theta'$ to approximately 90° leading as shown by OP″ at an angle $\theta''$; this determines the angles $\theta'$ and $\theta''$ in FIGURES 5 and 6.

FIGURE 9 shows a further alternative arrangement of this invention, in which some of the elements are similar to those of FIGURES 1 and 2 and are similarly numbered. FIGURE 9, however, provides for the firing of two SCR's 301 and 302 which are connected in inverse parallel between the A.C. input terminal 6 and the terminal 303 of the load 304 which is now an alternating current load. For this purpose, anode 305 of SCR 301 is connected to load terminal 303, and its cathode 306 is connected through conductor 26 to A.C. input terminal 6. Conversely, anode 308 of SCR 302 is connected through conductor 26 to A.C. input terminal 6, and its cathode 309 is connected to load terminal 303. The other terminal 311 of the load 304 is connected through conductor 34 to the A.C. input terminal 7 to complete the load circuit. Transformer 312 has its primary 313 connected across the output terminals OP of the phase-shifting network 2, and it has two secondaries 314 and 315. Secondary 314 is connected between the emitter 316 and base 317 of transistor 318, through a diode 320. Secondary 315 is connected, with opposite polarity to that of secondary 314, between the emitter 321 and base 322 of transistor 323, through diode 325. Accordingly, the base of each transistor 318 and 323 is driven positive during alternate half-cycles, while the diodes 320 and 325 prevent the bases from being driven negative.

The emitter 316 is connected through terminal 326 to the gate 307 of SCR 301. The emitter 321 is connected through terminal 327 to the gate 310 of SCR 302. The required collector current for each transistor is obtained from the voltage applied to the corresponding SCR anodes as follows: Anode 305 of SCR 301 delivers current through terminal 328 and resistor 330 to the positive terminal of zener diode 331 and thence through resistor 332 to the collector 319 of transistor 318; the negative terminal of zener diode 331 is connected through terminal 350 to the cathode 306 of SCR 301. In this way the transistor 318 is supplied with collector and emitter current, and is therefore in a position to fire the SCR, only during the portion of each cycle when the anode 305 of SCR 301 is sufficiently positive with respect to its cathode 306.

The positive voltage applied to the collector 319 is limited to a safe value by the zener diode 331; furthermore, the zener diode prevents the application of negative voltage to the collector 319. An important feature of this arrangement is that no gate current will be delivered to the gate 307 of SCR 301 while its anode 305 is negative, thus protecting the SCR against leakage and consequent heating while its anode is negative.

In similar fashion, the collector and emitter currents for transistor 323 are supplied from anode 308 of SCR 302, through terminal 329, resistors 333 and 334, and the collector voltage is limited in its positive value and prevented from becoming negative by means of the zener diode 335. The negative terminal of zener diode 335 is connected through terminal 351 to the SCR cathode 309.

Diodes 340 and 341 which are shown in dotted lines may be included in series with resistors 330 and 333 respectively, to reduce the power dissipated in said resistors.

FIGURES 10, 11 and 12 show the waveforms and phase relationships of various voltages in the arrangement of FIGURE 9 with respect to transistor 318 and SCR 301. In FIGURE 10, curve 401 shows on a reduced scale the waveform of the A.C. input voltage across the load 304 and SCR 301 in series. The dotted curve 403 shows the voltage across the zener diode 331 which is available for delivering a gate pulse through transistor 318 to the gate 307 of SCR 301. The dotted curve 402 shows the output voltage from the transformer secondary 314 which is in phase with the output between terminals O and P of the phase-shifting network 2, under ideal open-circuit conditions, and when no D.C. control current is flowing in saturable reactor winding 14; this output voltage 402 lags the input voltage 401 by an angle $\theta'$ of nearly 180° as shown in the vector diagram FIGURE 8.

Almost immediately after the transformed phase shifter output 402 has driven the base 317 of transistor 318 positive, the transistor will conduct at its saturation value and deliver a pulse 404 from its emitter 316 to the gate 307 of SCR 301. This will promptly fire the SCR since its anode voltage will already be positive, as shown by curve 401. However, as soon as the SCR has fired so that it conducts load current from anode 305 to cathode 306, its anode-to-cathode voltage will drop to its forward conduction value of approximately one volt and accordingly the collector supply voltage 403 will substantially disappear and the gate pulse 404 will be removed; accordingly the gate pulse is of short duration, as shown in FIGURE 10 and in the detail showing of FIGURE 13.

FIGURE 11 shows the phase relationships when sufficient D.C. control current is passed through saturable reactor winding 14 to result in the phase shifter output voltage 405 lagging the input voltage 401 by an angle $\theta'''$ of approximately 90 degrees. The available transistor collector voltage appearing across zener diode 331 is as shown by the dotted line 403, and the gate pulse 406 is again generated very shortly after the instant when the phase-shifter output 405 has become positive which is now at the angle $\theta'''$ which lags the input voltage by about 90 degrees; again the gate pulse 406 is of short duration and it disappears as soon as the SCR 301 has fired, since the collector supply voltage 403 disappears at that time. This is seen in the detail showing of FIGURE 14.

FIGURE 12 shows the phase relationships occurring when substantial D.C. control current is passed through winding 14, so that the output voltage 407 of the phase-shifting network 2 is leading the input voltage 401 by an angle $\theta''$ of approximately 90 degrees, as shown in FIGURE 8. The available collector voltage in this case remains at zero until the instant 409 at which the voltage 401 of SCR anode 305 becomes positive, and it then gradually builds up from 409 to 410. This is seen in the detail showing of FIGURE 15. Since the transistor base 317 has already been driven positive by the phase-shifter output 407, the collector-to-emitter current will also build up in accordance with the available collector voltage, between instants 409 and 410, and will deliver a pulse to gate 307 which also builds up gradually as shown at 408 until it is sufficient to fire the SCR; the firing of the SCR will immediately remove its anode voltage so that the collector supply voltage disappears at 410 and the gate pulse also drops to zero as shown at 414. This is seen in the detail showing of FIGURE 15.

The phase relationships of the voltages applied to transistor 323 and SCR 302 are similar to those of FIGURE 10, except that they are all displaced by 180 degrees. Important features of the invention are that no gate pulse can be formed while the anode is negative, and furthermore that the gate pulse is removed as soon as the SCR has fired, thus minimizing the heating of the gate.

The collector circuits of the transistors in FIGURES 1 and 2 may be supplied with current from the SCR anode as shown in FIGURE 9, instead of being supplied with direct current, and the waveforms will then be similar to those of FIGURES 10, 11 and 12 instead of FIGURES 5 and 6.

Figure 16:
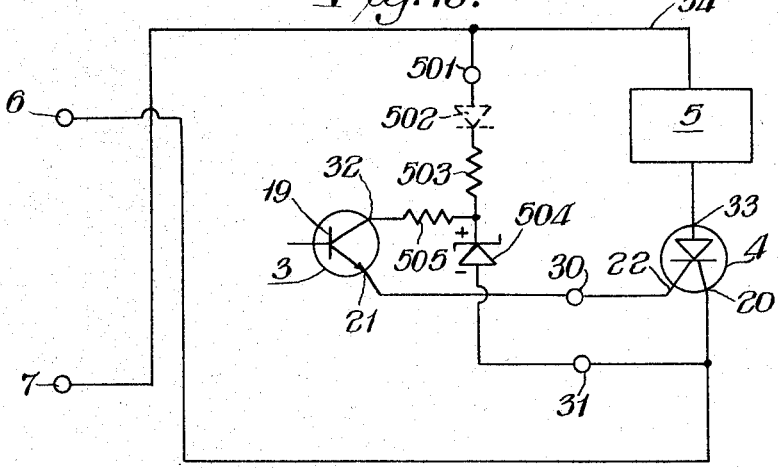
FIGURE 16 is a schematic diagram of a modified collector current portion of a controlled circuit according to this invention.

A further alternative arrangement for supplying the collector current is shown in FIGURE 16 which may be substituted for a part of the circuit shown in FIGURE 1 or in FIGURE 2. In FIGURE 16, the collector current is supplied from the A.C. input terminal 7 through conductor 34, terminal 501, and resistors 503 and 505. A voltage-limiting zener diode 504 has its positive terminal connected to the junction between resistors 503 and 505, and its negative terminal connected through terminal 31 to the cathode 20 of the SCR 4; a diode 502 may be connected in series with resistor 503 as shown in dotted lines, to reduce the power dissipated in said resistor.

Figure 17:
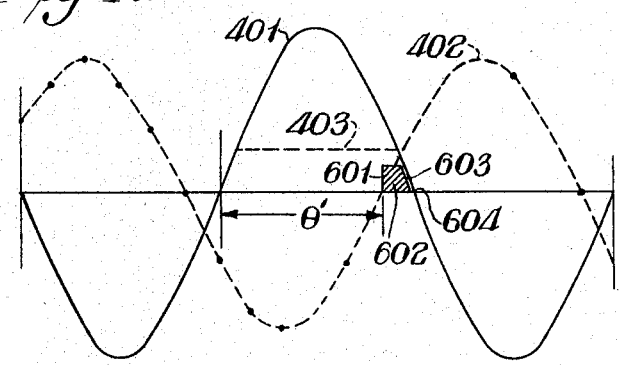
FIGURES 17, 18 and 19 illustrate wave forms and the voltage time relationships of the alternating voltage in the circuit of FIGURE 16.
Figure 18:
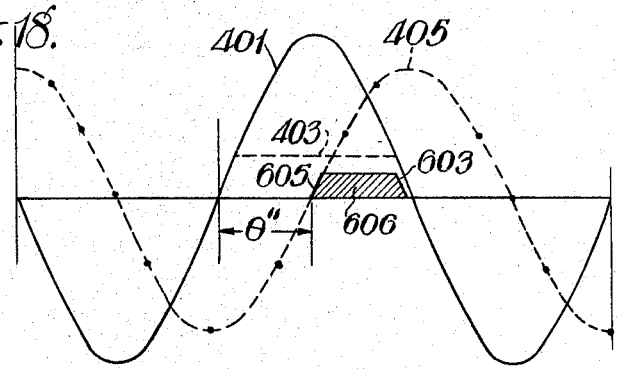
Figure 19:
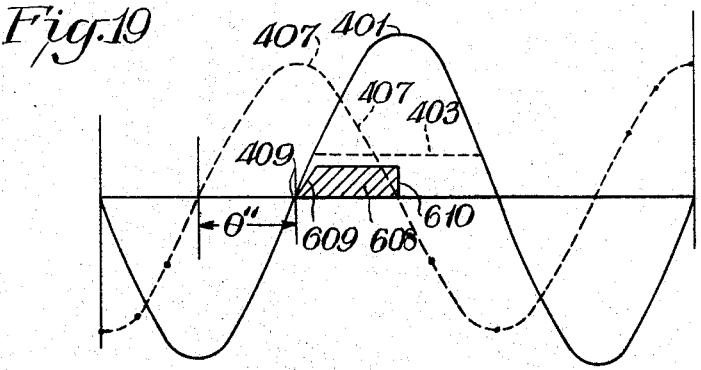

FIGURES 17, 18 and 19 show the waveforms and phase relationships of various voltages in the arrangement of FIGURE 16 when this is incorporated in the arrangement of FIGURE 1 or FIGURE 2.

Figure 20:
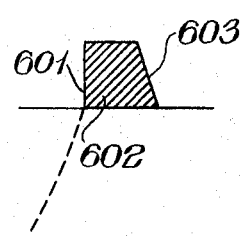
FIGURE 20 is a detail of the gate pulse and the inception of the gate pulse of FIGURE 17.

FIGURE 17 shows the conditions with no D.C. control current in the control winding 14 of saturable reactor 8. Curve 401 shows the A.C. input voltage to a reduced scale; curve 402 shows the output voltage of the phase-shifting network 2 under ideal open circuit conditions, either directly from terminals OP in FIGURE 1, or from the secondary 111 of transformer 110 in FIGURE 2. Curve 403 shows the voltage across the zener diode 504, which is available for supplying the collector 32 of transistor 3. Shortly after the phase shifter output 402 which is applied to the base 19 of transistor 3 has become positive, it drives the transistor into saturation and as illustrated by the detail showing of FIGURE 20, starts a pulse at 601 flowing from the emitter 21 through terminal 30 to the gate 22 of SCR 4. The SCR then fires at instant 601 and its anode conducts load current until the instant 604 when its anode becomes negative. In this arrangement, however, the collector supply voltage 403 is maintained and the collector 302 continues to receive current since the A.C. input 401 remains at a positive value, and accordingly the gate pulse is continued through the shaded area 602 until it dies away at 603, shortly before the A.C. input has fallen to zero at 604.

FIGURE 18 shows the phase relationships when the D.C. control current is sufficient to produce a phase-shifter output 405 which lags the A.C. input by an angle $\theta'''$ of approximately 90 degrees. The transistor 3 now delivers a gate pulse which starts at 605 and continues through shaded area 606 until it dies away at 603 due to loss of positive voltage from the A.C. input.

FIGURE 19 shows the phase relationships with a substantial D.C. control current which advances the phase angle of the phase-shifter output 407 so that the angle $\theta''$ leads the A.C. input 401 by approximately 90 degrees. In this case, the gate pulse cannot start as soon as the transistor base 19 is driven positive by the phase-shifter output 407, since there is no positive source of collector current until the instant 409 at which the A.C. supply voltage 401 starts to become positive. Shortly after instant 409, the voltage available for the collector builds up and the transistor delivers an increasing voltage to the SCR gate 22 as shown by the sloping part of the curve, and the SCR fires at some point 609 on this part of the curve. Thereafter, the gate pulse is maintained at a voltage shown by the shaded area 608 and finally disappears at 610 when the phase-shifter output is no longer positive.

This arrangement has the advantage that the gate pulse as shown by the shaded areas is of sufficient duration to insure firing of the SCR even if the load 5 is so highly inductive that the SCR anode current builds up slowly to its "holding value" at which it will continue to conduct after the gate pulse is removed. At the same time, the gate pulse is never applied during any period when the SCR anode 33 is negative with respect to its cathode 20, thus protecting the SCR against heating due to excessive reverse leakage.

Figure 21:
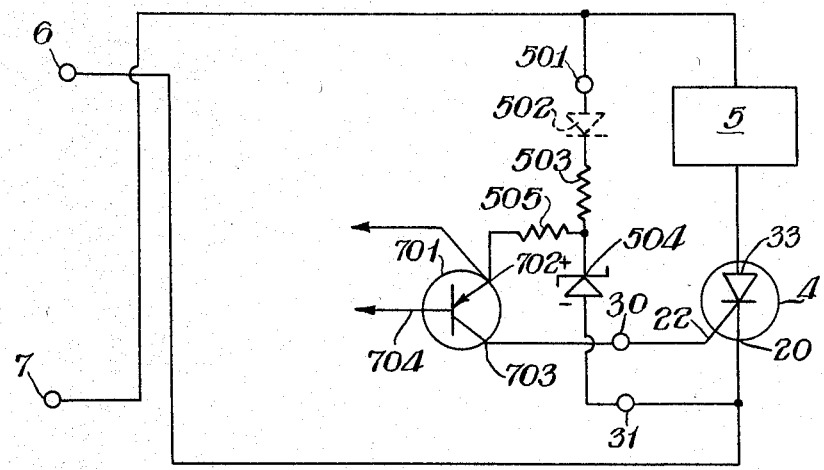
FIGURE 21 illustrates another modified collector current portion of the control circuit of FIGURES 1 and 2 according to this invention.

The arrangements heretofore described make use of an NPN transistor to supply the gate pulse to the SCR. The invention is however not limited to the use of an NPN transistor, and FIGURE 21 shows an example of an alternative arrangement for incorporation in FIGURE 1 or FIGURE 2, using a PNP transistor. This arrangement is generally similar to that of FIGURE 16, except that a PNP transistor 701 has been substituted for the NPN transistor 3 and its connections have been inverted as follows:

The emitter 702 is connected to the positive source of emitter-collector current, through resistor 505 (which may be omitted if desired) and resistor 503 and optional diode 502. The collector 703 is connected through terminal 30 to the gate 22 of SCR 4 and is in a position to deliver positive pulses thereto. The output OP of the phase shifting network 2 in FIGURE 1 or of the transformer secondary 111 in FIGURE 2 is connected between the base 704 of transistor 701 and the emitter 702.

The invention has been described with reference to a particular configuration of phase-shifting network which provides more than 180 degrees of phase shift. Such a phase-shifting network has the advantage that its output phase angle is substantially linear in relation to its D.C. control current over a full 180 degrees, and the non-linear portion of this relationship occurs after the phase angle has advanced by 180 degrees where its non-linearity is of no consequence. However, the circuits of the invention are not limited thereto, and may employ any other configuration of phase-shifting network.

I claim:

1. An electrical apparatus for connection to an alternating voltage source and to a controlled rectifier having a load connected to said rectifier and to an A.C. supply synchronized with said source including in combination a phase shifting network for producing an output voltage with substantially sine waveform variable in phase relationship to that of said source, means for providing a uni-directional current, a transistor coupled to said uni-directional current means, means connected to the transistor and connectible to a controlled rectifier for applying a firing signal of approximately square waveform to the rectifier, and means coupling said phase-shifting network to said transistor whereby the transistor is saturated by the output of said phase shifting network and the time of initiation of the square wave firing signal varies with respect to the initial application of each positive half-cycle of said alternating current supply.

2. An electrical apparatus as claimed in claim 1 in which means connect the uni-directional current source and the collector and emitter of the transistor in series across said firing terminals.

3. An electrical apparatus as claimed in claim 1 in which the transistor is an NPN transistor, the phase-shifting network output is connected to a transformer primary, a transformer secondary is connected to the base and emitter of the transistor, the emitter of the transistor is connected to one firing terminal, the collector is connected to the positive terminal of the uni-directional current means, and the negative terminal of the uni-directional current means is connected to the other firing terminal.

4. An electrical apparatus as claimed in claim 1 in which the means for providing the uni-directional current is a means for rectification of at least a part of the applied alternating voltage.

5. An electrical apparatus as claimed in claim 4 in which the transistor is an NPN transistor, the transistor emitter is connected to one firing terminal, the transistor collector is connected to the positive side of the means for providing the uni-directional current and the negative terminal of the uni-directional current source is connected to the other firing terminal and the output of said phase shifting network is connected between the base of said transistor and said negative terminal.

6. An electrical apparatus as claimed in claim 1 in which the phase-shifting network includes a capacitive element and an inductive element serially connected with an output terminal connected therebetween, means for energizing said elements in series with said alternating voltage source, means for varying the relative reactance of said elements, said phase shifting network produces an output voltage which is variable over more than 180° in relation to the applied alternating voltage.

7. An electrical apparatus including in combination a controlled rectifier having an anode and a cathode and a gate electrode, said anode and said cathode being connected through a load to an alternating voltage source, a phase shifting network for producing an output voltage of substantially sine waveform variable over at least a half-cycle in relationship to said alternating voltage source, means including a transistor coupled between said anode and said gate for applying a firing signal of substantially square waveform to said controlled rectifier, and means coupling said phase shifting network to said transistor whereby said transistor is saturated by the output of said phase shifting network and the time of application of the firing signal varies with respect to the initial application of each positive half-cycle of said alternating voltage applied to said anode.

8. An electrical apparatus as claimed in claim 7 in which said anode to gate coupling means include rectifying and voltage limiting means.

9. An electrical apparatus as claimed in claim 8 in which the rectifying and voltage limiting means is a zener diode connected to the cathode and a resistance connected to the anode.

10. An electrical apparatus for initiating the conduction of a controlled rectifier including in combination a controlled rectifier having an anode and a cathode and a gate electrode, a phase-shifting network for producing an output voltage of substantially sine waveform variable in phase relationship to an applied alternating voltage, said phase-shifting network containing a resistor, a capacitor and a variable inductive element whereby the phase relationship between the input voltage and the output voltage of said phase-shifting network is variable by changing the inductance of said variable inductive element, an NPN transistor, rectifying means providing a uni-directional current to the collector of said transistor, means connecting the emitter of the transistor to the gate of the controlled rectifier, and means connecting said phase-shifting network to the cathode of the rectifier, the anode of said rectifier being connected through a load to said applied alternating voltage, said phase-shifting network being coupled to said transistor so as to vary the time of application of a firing signal of substantially square waveform with respect to the initial application of each positive half-cycle of said alternating voltage applied to said anode.

11. An electrical apparatus for initiating conduction in a controlled rectifier including in combination a controlled rectifier having an anode and a cathode and a gate, a phase-shifting network for producing an output voltage variable in phase relationship to an applied alternating voltage of substantially sine waveform, an NPN transistor, a D.C. power source, the collector of the transistor being connected to the positive terminal of the power source, the emitter of the transistor being connected to the gate of the rectifier, the cathode of the rectifier being connected to the negative terminal of the power source, the anode of said rectifier being connected through a load to said applied alternating voltage, and a step-down transformer coupling said transistor to said phase-shifting network so as to vary the time of application of a firing signal of substantially square waveform to the rectifier from the transistor with respect to the initial application of each positive half-cycle of applied voltage to said anode of said controlled rectifier.

12. An electrical apparatus including in combination a phase shifting network for producing a voltage of substantially sine waveform variable in phase relationship to an applied alternating voltage, means for providing a uni-directional current, a transistor coupled to said uni-directional current means, and means coupling said phase-shifting network to said transistor to apply a phase variable current to the transistor base of such magnitude as to drive the transistor beyond the point of saturation of the collector current thereby delivering a current of substantially square waveform variable in phase relationship to the applied voltage.

References Cited by the Examiner

UNITED STATES PATENTS 2,977,523  3/1961  Cockrell _____ 318—331
3,088,075  4/1963  Pintell _____ 307—88.5

OTHER REFERENCES

Controlled Rectifier Manual: published by Rectifier Components Dept. of General Electric Co., 1960; FIGURE 7.1.

JOHN F. COUCH, *Primary Examiner.*

LLOYD McCOLLUM, *Examiner.*

K. W. HADLAND, K. D. MOORE, *Assistant Examiners.*